No. 758,070. PATENTED APR. 26, 1904.
A. O. HIGHSMITH.
COMPOUND TOOL.
APPLICATION FILED JUNE 13, 1903.
NO MODEL.
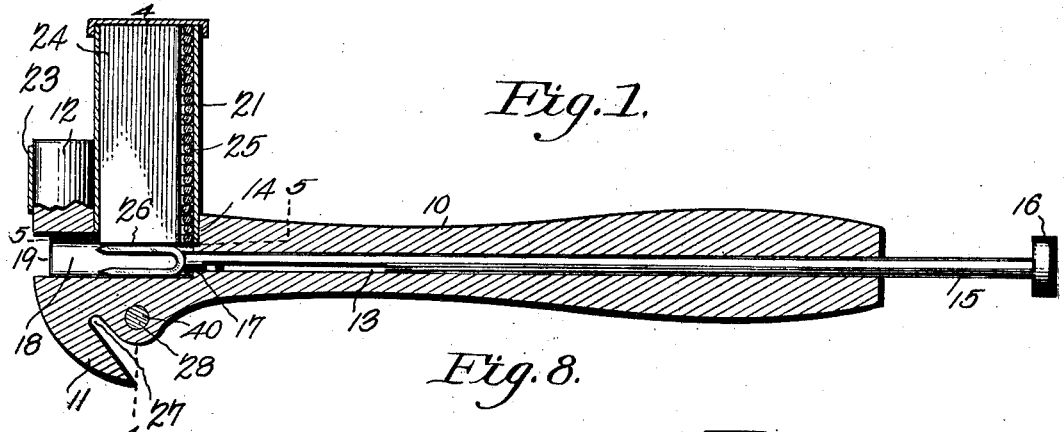
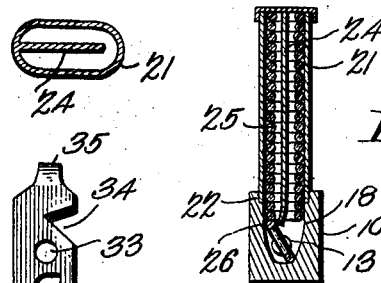
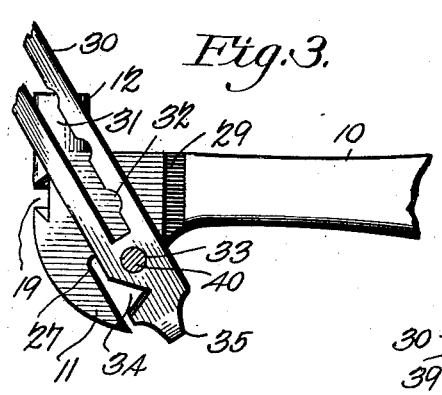
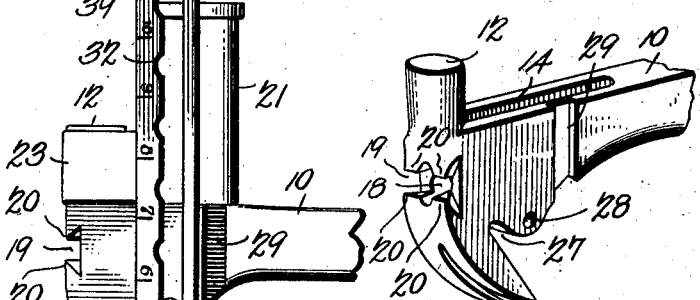
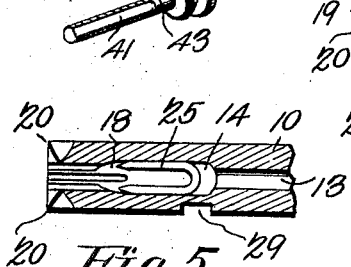
Aubrey O. Highsmith, Inventor:
by C. A. Snow & Co.
Attorneys
Witnesses
E. F. Stewart
C. N. Woodward No. 758,070. Patented April 26, 1904.

UNITED STATES PATENT OFFICE.

AUBREY O. HIGHSMITH, OF CANTON, TEXAS.

COMPOUND TOOL.

SPECIFICATION forming part of Letters Patent No. 758,070, dated April 26, 1904.

Application filed June 13, 1903. Serial No. 161,347. (No model.)

*To all whom it may concern:*

Be it known that I, AUBREY O. HIGHSMITH, a citizen of the United States, residing at Canton, in the county of Van Zandt and State of Texas, have invented a new and useful Compound Tool, of which the following is a specification.

This invention relates to compound tools for use more particularly in building and repairing wire fences and the like, and has for its object to simplify and improve devices of this character and to produce an implement by which the various steps of the work may be expeditiously accomplished; and the invention consists in certain novel features of construction as hereinafter shown and described, and specified in the claims.

In the drawings illustrative of the invention, in which corresponding parts are denoted by like designating characters, Figure 1 is a longitudinal sectional elevation. Fig. 2 is a side elevation of the head portion of the device, illustrating its use in driving the holding-staples. Fig. 3 is a view similar to Fig. 2, illustrating the use of the device as a wire-cutter. Fig. 4 is a transverse section on the line 4 4 of Fig. 1. Fig. 5 is a horizontal section on the line 5 5 of Fig. 1 with the plunger removed. Fig. 6 is a perspective view of the implement denuded of its magazine and gage, illustrating its condition when employed as a staple-puller. Fig. 7 is a perspective view of the flattened clamp-screw. Fig. 8 represents a transverse section of the staple-holder.

The improved implement consists of a handle or stock 10, having a hammer-head at one end, the latter provided with the usual claw 11 and driving-face 12, extending in opposite directions from the handle member, as shown.

Extending longitudinally through the handle member and likewise transversely through the "head" member is an aperture 13, and intersecting this longitudinal aperture is a transverse aperture 14, located just in the rear of the portion 12 of the head, as shown. Operating in the aperture 13 is a plunger 15, having a head 16 at its outer or "drive" end and a recess 17 in its inner or operating end. The aperture 13 is widened longitudinally and transversely of the hammer-head, as at 18, to the width of the staple which is to be driven, as shown in Fig. 5, so that the staples passing lengthwise through the feed-aperture 14 into the widened portion 18 will be reversed in position and be thrust point foremost from the implement by the plunger 15 and guided and supported while being thus acted upon by the walls of the aperture, as hereinafter shown.

Disposed in the outer end of the head member transversely of and transecting the portion 18 of the aperture 13 is a recess 19, the side walls of which are inclined both outwardly and longitudinally to the plane of the head member, whereby spaced "points" or claws 20 are formed at the outer terminals of the walls of the recess to assist in removing staples and wires, as hereinafter shown.

Extending upwardly from the aperture 14 and corresponding therewith is a magazine or staple-holder consisting of an outer shell 21, engaging the outer margin of the aperture 14 by a shoulder 22 in the latter and with a band 23 passing around the striking end 12 of the hammer, as shown. Within the magazine 21 is disposed a partition 24, extending from the side next the portion 12 and ending near the opposite side, as shown in Figs. 1 and 4, so that a plurality of the staples 25 will be supported within the magazine, as shown. The partition 24 is extended below the lower line of the magazine into the aperture 14, as shown at 26, to serve as a guide to the staples and insure their being properly conducted into the path of the plunger. The extension 26 is bent slightly to one side to retard one leg each of the staples as they consecutively pass downward, and thus cause them to be reversed in position and pass from the implement in proper position to engage the line-wires. The enlargement 18 will be gradually merged from the circular portion 13 into the vertical portion at the outlet of the aperture, so that the staples will freely turn one-fourth of a revolution and assume the proper position by gravity, as will be obvious.

Formed in the head portion at the juncture of the "claw" 11 and the handle member 10 is a transverse recess 27, forming one jaw member of a wire-severing device, and disposed transversely through the handle member adjacent to the recess 27 is a threaded aperture 28, and adjacent to the aperture 28 is a recess 29 in the face of the handle member at right angles to the aperture 28, as shown.

A gage is provided consisting of a bar 30, having a longitudinal slot 31, with spaced enlargements 32, an aperture 33, a knife-edged recess 34, a screw-driver 35 at one end and with the other end concaved, as at 36. Formed in one side of the member 30, between the terminal of the slot 31 and the concaved end 36, is a recess having reversely-inclined side walls 37 38, the wall 38 having spaced serrated teeth and forming means for engagement with a nut, the recess with its serrated wall thus serving as a wrench capable of grasping nuts of any size within the range of the recess. The member 30 will also be provided with a scale of inches, as at 39. The threaded aperture 28 is adapted to receive a threaded stud 40, having one portion flattened, as at 41, to conform in width with the slot 31, while the main unflattened portion next to the turning-knob 42 is left whole, as shown at 43. The portion 43 will pass through the slot 31 at the points where the enlargements 32 occur, and when so placed it is obvious the gage member will rotate upon the stud, but cannot be moved longitudinally thereon. When, however, the stud is unscrewed until a portion of the flattened portion 41 is within the slot 31, the member 30 can be adjusted to any desired extent. When employed in "stapling" the lead-wires in building fences, the gage will be employed to denote the distance apart of the wires by resting the concaved portion 36 upon the wire adjacent to the one being stapled.

When the device is to be employed for severing wire, the stud 40 will be inserted in the aperture 33, which will transform the device into a pair of shears by which a wire may be severed between the parts 27 34, as will be obvious. If two wire ends are to be spliced, they will be placed side by side in the recess 29 and the gage member screwed down tightly over them, by which means they will be firmly held until the splicing action is complete.

The magazine will be provided with any suitable closure to prevent the escape of the staples.

When staples are to be detached, they are first loosened by the screw-driver end 35, employed as a pry. The aperture 19 is then placed over lead-wire opposite the staple. Then by twisting the handle member and at the same time swinging it sidewise the claws 20 will pass over the lead-wire between the post and hammer-head and quickly draw the staple by forcing the handle member downward and rolling the head member on the claw 11. By having two sets of the claws 20 it is obvious the staple may be pulled from either side, which will be very convenient under certain circumstances when the staples are in relatively inaccessible positions The handle member 10 and head member 11 12 will preferably be integral, of any suitable metal, with steel or other suitable bearing-surfaces where the greatest wear occurs. The gage will preferably be of steel and will be employed for the various purposes described.

The device may be of any desired or suitable size.

Having thus described the invention, what is claimed is—

1. An implement for use in building and repairing fences, consisting in a hammer having a longitudinal aperture through the handle and transversely through the head and with a lateral aperture in the handle member in the rear of the head and intersecting the longitudinal aperture, a plunger operating in said longitudinal aperture and a magazine for a plurality of staples and engaging said lateral aperture, and having a supporting-band encircling the hammer-head adjacent to its striking-face, substantially as described.

2. An implement for use in building and repairing fences, consisting in a hammer having a longitudinal aperture through the handle and transversely through the head and with a lateral aperture in the handle member in the rear of the head and intersecting the longitudinal aperture, a plunger operating in said longitudinal aperture and a magazine for a plurality of staples engaging said lateral aperture and provided with an internal web extending partially across the magazine and dividing the interior thereof into two compartments connected at one end, said web extending into said lateral aperture with its lower end bent slightly to one side, substantially as described.

3. An implement for use in building and repairing fences, consisting in a hammer having a longitudinal aperture through the handle and transversely through the head and with a lateral aperture in the handle member in the rear of the head and intersecting the longitudinal aperture, a plunger operating in said longitudinal aperture and a magazine for a plurality of staples engaging said lateral aperture, and having a supporting-band encircling the hammer-head adjacent to its striking-face, said magazine having an internal web extending partially across the magazine and dividing the interior into two compartments united at one end, substantially as described.

4. An implement for use in building and repairing fences, consisting in a stock having a longitudinal aperture and with an intersecting lateral aperture wider than the longitudinal aperture and in which staples are adapted to be automatically reversed by gravity, a magazine for staples associated with said stock and from which the staples are fed by gravity into said transverse aperture, and having an interior partition extending into said lateral aperture and deflected to one side and adapted to guide the staples and retard one leg of each and cause them to be consecutively reversed as they pass into the longitudinal receptacle, and a plunger operating in said longitudinal aperture, substantially as described.

In testimony that I claim the foregoing as my own I have hereto affixed my signature in the presence of two witnesses.

AUBREY O. HIGHSMITH.

Witnesses:
   OTIS L. SMITH,
   D. GALBREASH.